(12) United States Patent
Kolb

(10) Patent No.: US 6,672,549 B2
(45) Date of Patent: Jan. 6, 2004

(54) HOLDER, IN PARTICULAR FOR AN ELECTRONIC DEVICE OR AN EXHIBITION OBJECT

(76) Inventor: Anke Kolb, Conventstrasse 8-10, 22089 Hamburg (DE)

(*) Notice: Subject to any disclaimer, the term of this patent is extended or adjusted under 35 U.S.C. 154(b) by 0 days.

(21) Appl. No.: 10/096,582

(22) Filed: Mar. 14, 2002

(65) Prior Publication Data

US 2002/0130227 A1 Sep. 19, 2002

(30) Foreign Application Priority Data

Mar. 14, 2001 (DE) ..................................... 201 04 339 U

(51) Int. Cl.[7] .............................................. A45D 19/04
(52) U.S. Cl. ....................... 248/127; 248/459; 248/909; 248/917
(58) Field of Search ................................ 248/459, 174, 248/909, 127, 917, 176.1; 40/124.1; 211/43, 195; D19/34.1

(56) References Cited

U.S. PATENT DOCUMENTS

| | | | | |
|---|---|---|---|---|
| 502,321 A | * | 8/1893 | Richards | 211/43 |
| 631,520 A | * | 8/1899 | Dalsheimer | 248/459 |
| 812,993 A | * | 2/1906 | Harper | 248/459 |
| 1,056,183 A | * | 3/1913 | Kislovitz | 248/459 |
| 2,553,174 A | * | 5/1951 | Cross | 248/459 |
| 4,291,798 A | * | 9/1981 | Transport | 206/45.24 |
| 4,428,555 A | * | 1/1984 | Atkins | 248/459 |
| 4,460,146 A | * | 7/1984 | Raggiotti | 248/456 |
| 4,622,767 A | * | 11/1986 | Sullivan | 40/120 |
| 5,083,663 A | * | 1/1992 | Conway et al. | 206/45.26 |
| 5,234,190 A | * | 8/1993 | Cross | 248/459 |
| 6,231,023 B1 | * | 5/2001 | Morton | 248/441.1 |
| 6,334,539 B1 | * | 1/2002 | Jajko et al. | 211/42 |

* cited by examiner

Primary Examiner—Korie Chan
(74) Attorney, Agent, or Firm—Diller, Ramik & Wight

(57) ABSTRACT

The holder in particular for an electronic device, such as a mobile phone, a remote control, a palmtop or similar or an exhibition object, comprises a plate element (12) having an upper side, a lower side and a recess (36) formed in said plate element (12), said recess (36) being defined by a recess edge (38). Further, at least one stand flap (30) protruding from a first section (40) of the recess edge (38) and hingedly connected with said recess edge (38) is provided for supporting the plate element (12) on a surface. For gripping under an electronic device to be placed on the plate element (12) there is provided at least one undergripping flap (32) protruding from a second section (42) of the recess edge (38), said second section (42) being essentially located opposite the first section (40), and hingedly connected with the recess edge (38). A groove (48) or perforation (66,68,70) is arranged in the plate element (12) within the first section (40) of the recess edge (38) for hingedly connecting the stand flap (30) with the recess edge (38) for the purpose of moving the stand flap (30) beyond one of the two sides out of the plane of the plate element (12). Finally, a groove (50) or perforation (66,68,70) is arranged in the plate element (12) for hingedly connecting the undergripping flap (32) with the recess edge (38) for the purpose of moving the undergripping flap (32) beyond the other one of the two sides of the plate element (12) out of the plane of the plate element (12).

12 Claims, 4 Drawing Sheets

HOLDER, IN PARTICULAR FOR AN ELECTRONIC DEVICE OR AN EXHIBITION OBJECT

BACKGROUND OF THE INVENTION

The invention relates to a holder, in particular for an electronic device, and in particular to a holder for a mobile phone (wireless phone or cellular phone), a remote control, a palmtop or similar. The holder according to the invention can e.g. also be used for presenting exhibition objects, e.g. in shop windows, show cases or similar.

Electronic hand-held devices, such as mobile phones, remote controls and palmtops, are normally provided with a keyboard and a display which is sometimes configured as a touchscreen. Various holders are available which allow convenient operation of such devices and convenient view at the display even when said devices are not held in the hand but are e.g. placed on a table or similar. For example, cellular phone holders for motor vehicles exist, which are on the one hand adapted to the cellular phone housings and on the other hand permanently fastened in the vehicle. For palmtops (electronic calendars) holders exist which are configured to be placed onto a surface (table or similar) and are also adapted to the housing of the palmtop.

SUMMARY OF THE INVENTION

It is an object of the invention to provide a holder for electronic hand-held devices which is universally applicable, easy to manufacture and can conveniently be used in particular as advertiser.

According to the invention a holder for an electronic device, such as a mobile phone, a remote control, a palmtop or similar or an exhibition object, is suggested, the holder comprising:
- a plate element having an upper side and a lower side,
- a recess formed in said plate element, said recess being defined by a recess edge,
- at least one stand flap protruding from a first section of the recess edge and hingedly connected with said recess edge, configured for supporting said plate element on a surface, and
- at least one undergripping flap protruding from a second section of the recess edge, said second section being essentially arranged opposite the first section, and hingedly connected with the recess edge, configured for undergripping an electronic device to be placed onto the plate element,
- wherein a groove or perforation is arranged in the plate element within the first section of the recess edge for hingedly connecting the stand flap with the recess edge for the purpose of moving the stand flap beyond one of the two sides out of the plane of the plate element, and
- wherein a groove or perforation is arranged in the plate element for hingedly connecting the undergripping flap with the recess edge for the purpose of moving the undergripping flap beyond the other one of the two sides of the plate element out of the plane of the plate element.

The holder according to the invention is configured as an integral material blank comprising in particular a sandwich-type plate element preferably configured as a rectangle. The plate element preferably comprises two outer layers forming the upper and the lower outer layer of the plate element. These two outer layers are made from a plastically deformable material, in particular a metallic material and preferably aluminium or an aluminium alloy or copper or brass. Between the two outer layers at least one inner layer made from a flexible material, in particular a thermoplastic material, is provided.

The plate element can be a sandwich structure or can be produced without an inner layer so that it only comprises one layer.

The plate element comprises a recess defined by a recess edge having a plurality of sections extending at an angle to each other. Hingedly connected with said recess edge are a stand flap and an undergripping flap. These two flaps are connected with the recess edge in the form of living hinges. The living hinge of the stand flap is preferably formed by arranging a groove in one of the two outer layers (e.g. the lower outer layer), wherein said groove extends through the respective outer layer up to or into the inner layer. Preferably the bottom of the groove lies approximately in the middle of the thickness of the inner layer. This allows the stand flap to be moved or pivoted out of the plane of the plate element and beyond the respective outer layer, i.e. by plastic deformation. Said plate element is thus supported on a surface by the stand flap at an inclination to said surface (similar to a picture holder placed on a surface). Looking at the plate element from the front, i.e. looking at the outer layer averting the surface, the groove configured for attaching the stand flap via the living hinge is not visible; rather the other one of the two outer layers, which does not comprise any grooves in this area, is visible in the area of attachment of the stand flap to the recess edge. Depending on the viewing direction the grooves are visible and can thus be integrated as design elements in the holder design.

In the same way the undergripping flap is also flexibly attached to the recess edge of the plate element, said undergripping flap being deformable towards the front side of the plate element such that it grips under an electronic hand-held device to be placed onto the inclined plate element. Consequently, the groove provided for attaching the undergripping flap via a living hinge is arranged on the plate element front or upper outer layer facing the viewer and extends up to or into the inner layer.

The stand flap and the undergripping flap of the plate element of the holder according to the invention are arranged on first and second sections of the recess edge, said first and second sections being essentially disposed opposite each other, and extend into the recess when the flaps are arranged in the plane of the plate element. When the two flaps are oriented in a way required for setting up the holder on a surface, the two flaps are bent out of the recess. As the electronic hand-held device in most cases has round forms and in particular rounded rear sides for optical and ergonomical reasons as well as for reasons of improved haptics, the housing of these electronic hand-held devices slightly extends into the recess when said devices are placed onto the holder, which results in a centering effect. But even electronic devices having a flat level rear side can be placed onto the holder according to the invention in that they are leaned against the inclined plate element in the condition as undergripped by the undergripping flap. The holder according to the invention is also realizable by means of a plate element which is completely made of one material. Said material then comprises grooves for flexible attachment of the flaps.

The holder according to the invention is easy to manufacture as a material blank and can be dispatched in the flat condition in a space-saving and thus inexpensive manner. Setting-up of the holder, i.e. alignment of the stand flap and the undergripping flap, is very simple, which facilitates handling of the holder both during setting-up and during use. Further, the plate element of the holder may serve as an advertiser in that it is e.g. provided with prints.

The aforementioned grooves constitute local weakened portions of the plate element such that the flaps are easier to bend. These weakened portions of the material can also be realized in a different manner, e.g. by perforations which penetrate the plate element or partial layers of the plate element. Further, a combination of grooves and perforations can be employed.

According to a preferred aspect of the invention at least two supporting flaps are provided which are arranged laterally relative to the stand and the undergripping flap and protrude from third and fourth sections of the recess edge, said third and fourth sections essentially extending transversely to the first and second sections, on which the stand and the undergripping flap are arranged, and being positioned between them. The supporting flaps, too, are preferably hingedly connected via a living hinge-type connection or via perforations with the recess edge for the purpose of plastic deformation, wherein the grooves arranged for this purpose are provided in the same outer layer as the groove provided for hingedly connecting the stand flap. These two lateral supporting flaps narrow the recess in the area of the supporting flaps such that even smaller-sized electronic hand-held devices can be placed onto the holder. This allows the holder to be used for electronic devices with a relatively large variety of housing sizes and housing shapes (round, oval, polygonal etc.).

To allow the stand flap to be configured with a relatively large width when lateral supporting flaps are provided such that the plate element is securely supported on a surface, it is advantageous if the stand flap comprises recesses in its side edges facing the supporting flaps, in which recesses the supporting flaps are accommodated when the stand flap and the supporting flaps are arranged in the plane of the plate element and protrude into the recess. In this way almost the entire width of the recess (extension of the recess between the recess edge sections provided with the supporting flaps) can be utilized by the stand flap. The stand flap may further extend beyond the supporting flaps up to the vicinity of the undergripping flap. Owing to the recesses in the side edges of the stand flap the flaps can thus be arranged in a space-saving manner within the recess. This is advantageous with regard to waste of material. The individual flaps can thus be formed by arranging three slots in the plate element. Two of these (longitudinal) slots extend along the side edges of the stand flap along the third and fourth sections of the recess edge and around the side flaps as well as along the side edges of the undergripping flap, while the third slot extends between the free ends of stand flap and undergripping flap and thus transversely to the longitudinal slots to connect the longitudinal slots with each other.

BRIEF DESCRIPTION OF THE DRAWINGS

Hereunder the invention is explained in detail with reference to the drawings in which.

DESCRIPTION OF THE PREFERRED EMBODIMENT

Hereunder the invention is explained with reference to an embodiment of the holder according to the invention which is to be used for a mobile phone. Different views and sections of the material blank for said holder 10 are shown in FIGS. 1 to 4.

Figure 1:
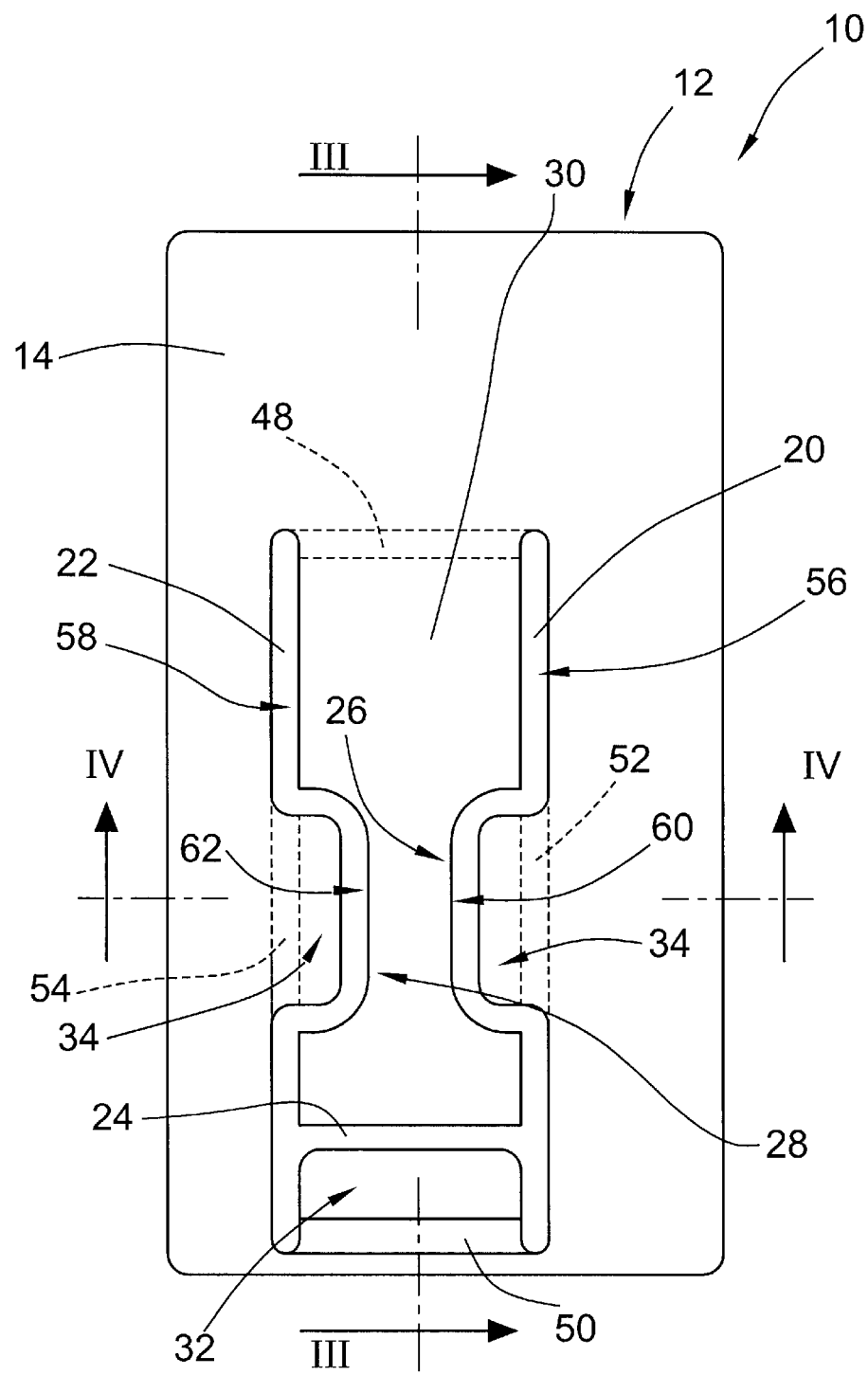
FIG. 1 shows a front view of the plate element of a holder according a first embodiment.
Figure 2:
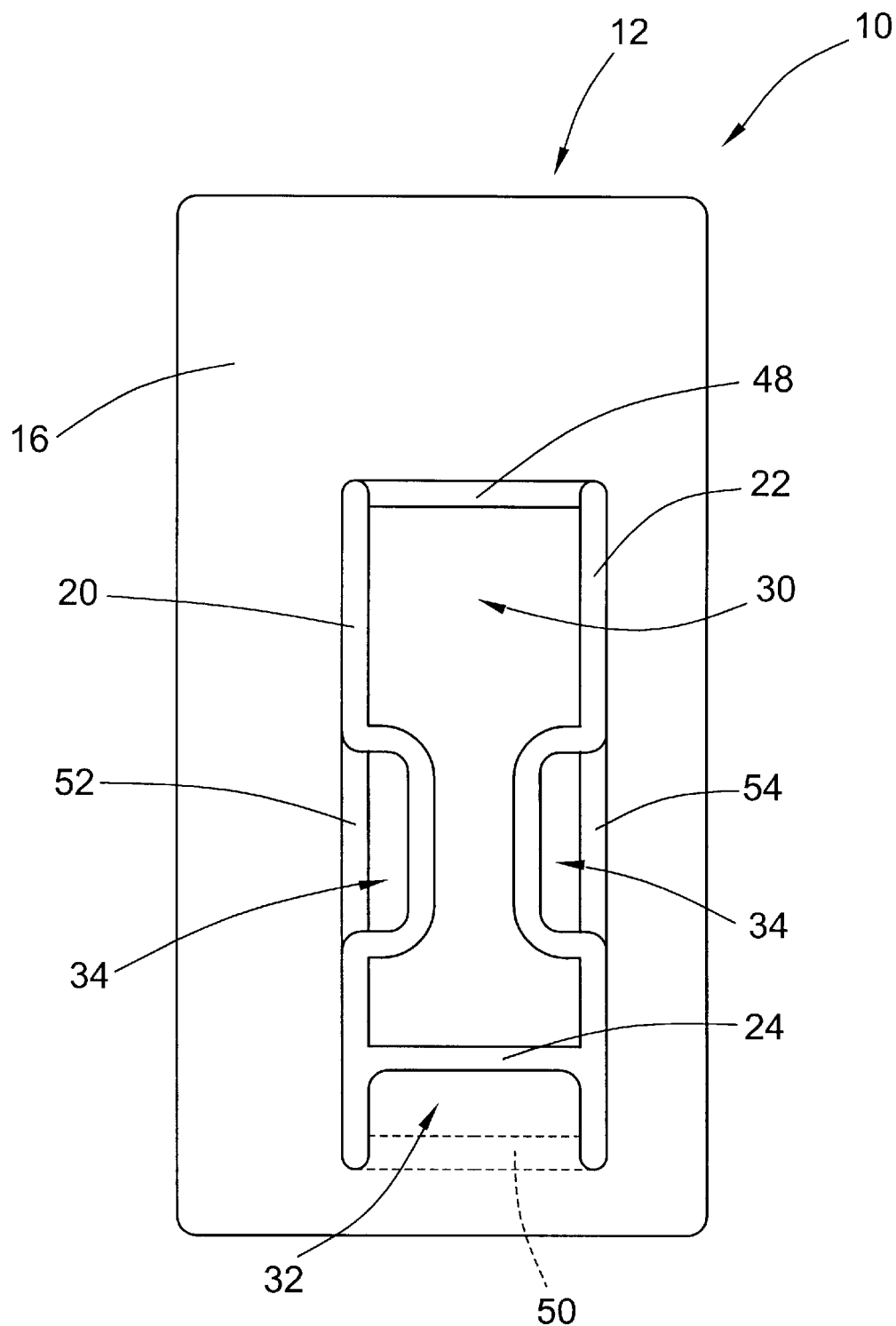
FIG. 2 shows a rear view of the plate element shown in FIG. 2, FIGS. 3 and 4 show side views along lines III—III and IV—IV, respectively, of FIG. 1.
Figure 3:
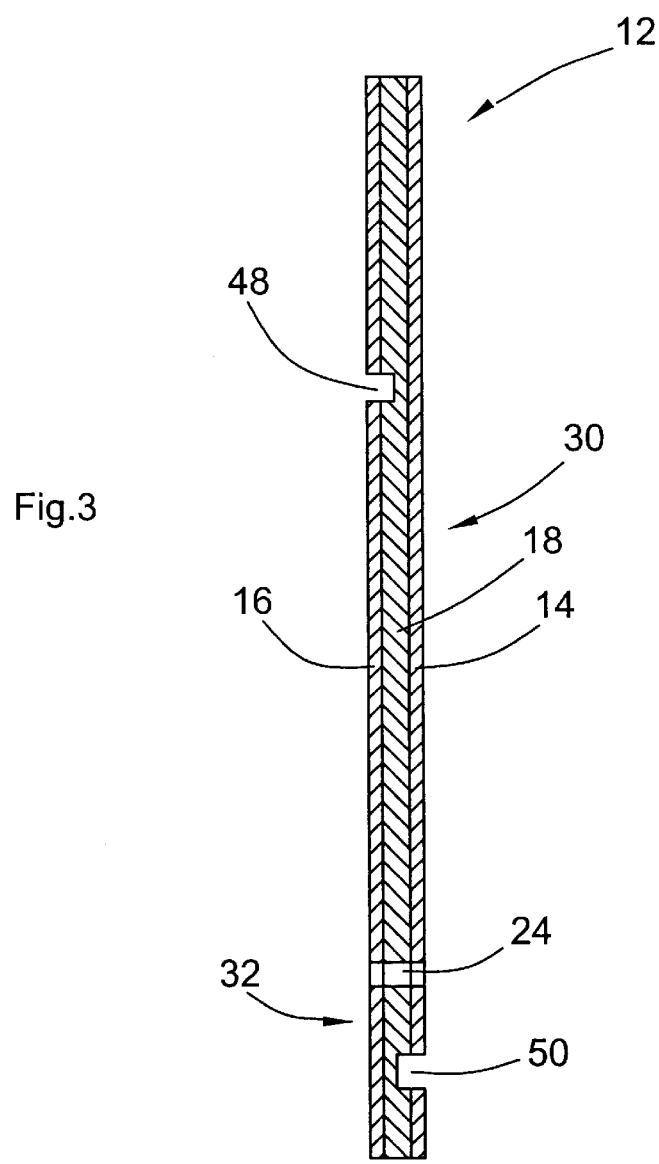
Figure 4:
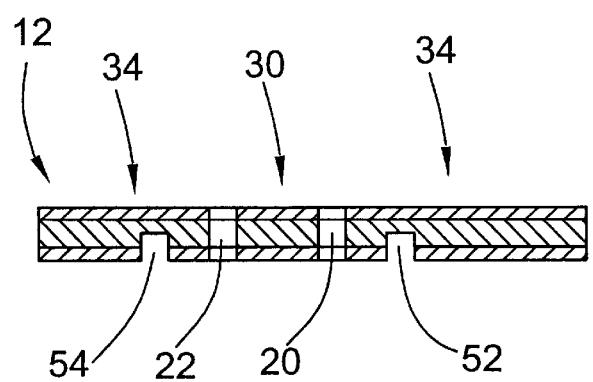

According to FIGS. 1 to 4 the holder 10 comprises a plate element 12 of sandwich configuration. As shown in FIGS. 3 and 4 the plate element 12 is of three-layer configuration and comprises a first outer layer 14 (hereinafter referred to as upper outer layer), a second outer layer 16 (hereinafter referred to as lower outer layer) and an inner layer 18 arranged between said outer layers 14 and 16. All layers are permanently connected with each other. The two outer layers 14,16 are made of a plastically deformable material (in the present embodiment they are made of aluminium), whereas the inner layer 18 is made of a flexible (plastic) material (in the present embodiment it is made of a thermoplastic material). The overall thickness of the plate element 12 is e. g. 2 mm, wherein each outer layer 14,16 is approximately 0.3 mm thick and the inner layer 18 is approximately 1.4 mm thick.

The plate element 12 is provided with two longitudinal slots 20,22 and a transverse slot 24 connecting the two longitudinal slots 20,22, the slots extending over the overall thickness of the plate element 12. Said slots 20 to 24 essentially have the form of the letter "H" with the cross-stroke being formed by the transverse slot 24 and being displaced downwards. The two sections of the vertical strokes of the letter "H" located above the cross-stroke and formed by the sections of the longitudinal slots 20,22 comprise symmetrical indentations 26,28. Owing to this configuration and orientation of the slots 20 through 24 four flaps are formed which are connected with the plate element 12. These flaps are a stand flap 30, an undergripping flap 32 and two lateral supporting flaps 34.

All flaps 30 to 34 are hingedly connected with the plate element 12 and can be plastically deformed out of the plane of the plate element 12. In this condition a recess 36 is formed in the plate element 12, which is defined by a recess edge 38 having a first section 40, a second section 42 extending in parallel to said first section 40, a third section 44 essentially extending at right angles to the two sections 40,42, and a fourth section 46 extending in parallel to said third section 44. The stand flap 30 is hingedly connected with the first section 40 of the recess edge 38, whereas the undergripping flap 32 is hingedly connected with the second section 42 of the recess edge 38. The two supporting flaps 34 are hingedly connected with the third and fourth sections 44 and 46, respectively, of the recess edge 38.

The hinged connection of all flaps with the plate element 12 is configured in the form of living hinges. Said living hinges are formed by providing grooves in the plate element 12. With regard to hingedly connecting the supporting flap 34 this means that a groove 48 is arranged in the lower outer layer 16 along the recess edge 38, said groove 48 extending into the inner layer 18 and its depth amounting to approximately half the overall thickness of the plate element 12. The groove 50 provided for hingedly connecting the undergripping flap 32 is arranged in the plate element 12 from the upper outer layer 14. This groove, too, extends up to approximately half the overall thickness of the plate element 12. The grooves 52,54 configured for hingedly connecting the supporting flaps 34 are arranged in the plate element 12 from the lower outer layer 16 of the plate element 12 and also end approximately in the middle of the overall thickness of the plate element 12.

In the area of each groove 48 to 54 one of the two outer layers 14 and 16 and approximately half the inner layer 18 remain as material thickness. Since the outer layer is plastically deformable and the flexible inner layer 18, which may be made of restorable material, such as plastic material, is weakened, the flaps 30 to 34 essentially remain in their respective bending position when they are moved out of the plane of the plate element 12. Owing to the arrangement described above of the grooves 48 to 54 in the upper and/or lower side of the plate element 12 no grooves are visible for the viewer in the condition of use of the holder 10 (see FIG. 5), which improves the optical appearance of the holder 10. By bending the undergripping flap 32 to such an extent that the flap 32 extends essentially horizontally the groove 50, too, is not visible for the viewer. The other grooves are not visible for the viewer either since they are provided on the lower side of the plate element 12. This results in an optically attractive general impression.

As shown in FIGS. 1 and 2 the stand flap 30 comprises recesses 60,62 formed by indentations 26,28 in its side edges 56,58, in which recesses 60,62 the supporting flaps 34 are located when the stand flap 30 and the supporting flaps 34 are arranged in the plane of the plate element 12. Besides a space-saving accommodation of all flaps inside the recess 36 with minimal waste of material this configuration of the stand flap 30 with the lateral recesses 60,62 presents an optically attractive appearance. The "foot" 64 proper of the stand flap 30 has a larger width since the recesses 60,62 are arranged above said foot, which is advantageous with regard to the stability of the holder 10 when it is set up.

Figure 5:
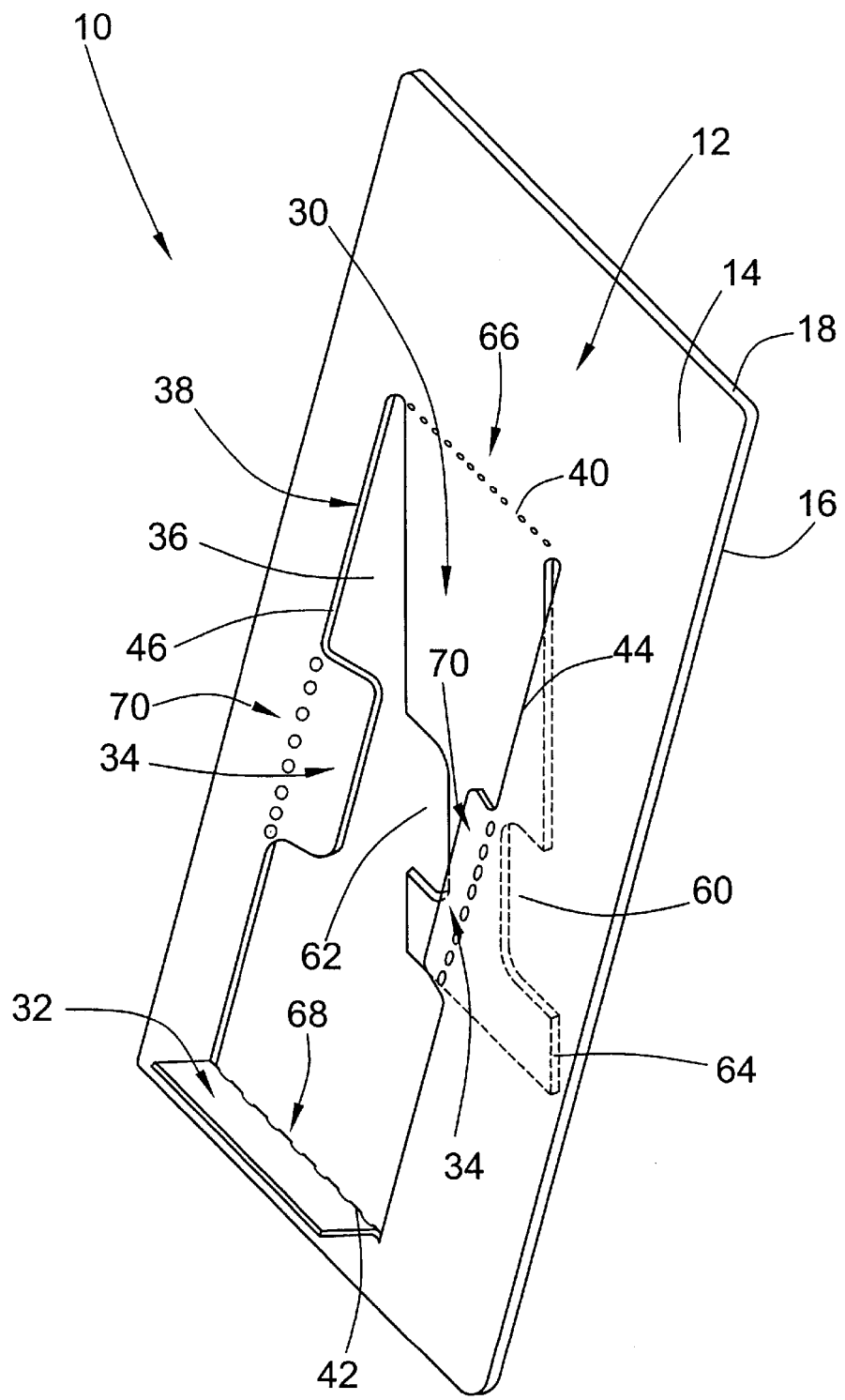
FIG. 5 shows a perspective view of the holder according to an alternative embodiment in the set-up condition.

FIG. 5 shows a holder with an alternative configuration of the weakening lines (hinged connections) of the flaps. In this embodiment the articulations of the flaps 30 to 34 are also realized by perforations (66,68,70) in the form of perforated lines 66,68,70.

Although a preferred embodiment of the invention has been specifically illustrated and described herein, it is to be understood that minor variations may be made without departing from the spirit and scope of the invention, as defined in the appended claims.

What is claimed is:

1. A holder for an electronic device, such as a mobile phone, a remote control, a palmtop or similar or an exhibition object comprising:
   a plate element (12) having two sides in the form of an upper side and a lower side,
   a recess (36) formed in said plate element (12), said recess (36) being defined by a recess edge (38),
   at least one stand flap (30) protruding from a first section (40) of the recess edge (38), being hingedly connected with said recess edge (38), and being configured for supporting said plate element (12) on a surface,
   at least one undergripping flap (32) protruding from a second section (42) of the recess edge (38); said second section (42) being essentially located opposite the first section (40) of the recess edge (38), being hingedly connected with the recess edge (38), and being configured for undergripping an electronic device to be placed onto the plate element (12),
   one of a groove (48) and a perforation (66,68,70) being arranged in the plate element (12) within the first section (40) of the recess edge (38) for hingedly connecting the stand flap (30) with the recess edge (38) for the purpose of moving the stand flap (30) beyond one of the two sides out of a plane of the plate element (12), and
   one of said groove (50) and perforation (66,68,70) being arranged in the plate element (12) for hingedly connecting the undergripping flap (32) with the recess edge (38) for the purpose of moving the undergripping flap (32) beyond the other one of the two sides of the plate element (12) out of the plane of the plate element (12),
   at least two supporting flaps (34) protruding from third and fourth sections (44,46) of the recess edge (38), said third and fourth sections (44,46) essentially lying opposite each other and between said first and second sections (40,42) of said recess edge (38), and one of said one groove (52,54) and perforation (66,68,70) each is arranged in the plate element (12) in the third and fourth sections (44,46) of the recess edge (38) for hingedly connecting the supporting flaps (34) with the recess edge (38) for the purpose of moving said supporting flaps (34) beyond one of the two sides of the plate element (12) out of the plane of the plate element (12).

2. Holder according to claim 1, wherein the at least one stand flap (30) comprises side edges (56,58) facing the third and the fourth section (44,46) of the recess edge (38), and said side edges (56,58) are provided with side recesses (60,62) into which the supporting flaps (34) are inserted when said supporting flaps (34) and the stand flap (30) are arranged in the plane of the plate element (12).

3. Holder according to claim 2, wherein the side recesses (60,62) of the stand flap (30) are spaced apart from the end (64) of the stand flap (30) located opposite the first section (40) of the recess edge (38).

4. Holder according to claim 2, wherein the first and second sections (40,42) and the third and fourth sections (44,46) of the recess edge (38) essentially extend parallel to each other, and the first and second sections (40,42) of the recess edge (38) extend essentially at right angles to the third and fourth sections (44,46) of the recess edge (38).

5. Holder according to claim 1, wherein the plate element (12) is of one-piece configuration and comprises one of a metal and a metal alloy and in particular one of aluminum and an aluminum alloy.

6. Holder according to claim 1, wherein the plate element (12) has a sandwich configuration having an upper and a lower outer layer (14, 16) made of plastically deformable material and at least one inner layer (18) of a flexible material positioned between the outer layers (14,16), and grooves (48,50,52,54) or perforations (66,68,70) for hingedly connecting the flaps (30,32,34) to extend through one of the two outer layers (14,16) up to or into the inner layer (18).

7. Holder according to claim 6, wherein the grooves (48,50,52,54) or perforations (66,68,70) extend through the same outer layer (14,16) or through different outer layers (14,16).

8. Holder according to claim 6, wherein the plastically deformable material of the outer layers (14,16) is one of a metal and a metal alloy and in particular one of aluminum and an aluminum alloy, copper, brass, and the flexible material of the inner layer (18) is a plastic material and in particular a thermoplastic material.

9. Holder according to claim 1, wherein the flaps (30,32, 34), when arranged in the plane of the plate element (12), are separated from each other by two longitudinal slots (20,22) extending between the third and fourth sections (44,46) of the recess edge (38) and the supporting flaps (34) on the one hand and the stand flap (30) on the other hand, and by a transverse slot (24) connecting said longitudinal slots (20, 22) and extending between the stand flap (30) and the undergripping flap (32).

10. Holder according to claim 9, wherein the grooves or perforations (66,68,70) in the sections (40,42,44,46) of the recess edge (38) each include a bottom lying essentially in the middle of the thickness of the plate element (12).

11. Holder according to claim 6, wherein the plastically deformable material of the outer layers (14, 16) is one of a metal and a metal alloy and in particular one of aluminum and an aluminum alloy, copper and brass.

12. Holder according to claim 6, wherein the flexible material of the inner layer (18) is a plastic material and in particular a thermoplastic material.

* * * * *